(12) United States Patent
Stanjek et al.

(10) Patent No.: US 8,642,708 B2
(45) Date of Patent: Feb. 4, 2014

(54) SILANE-CROSSLINKING COMPOSITIONS

(75) Inventors: Volker Stanjek, Ampfing (DE); Bernd-Josef Bachmeier, Haiming (DE); Andreas Bauer, Kirchdorf (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/704,713

(22) PCT Filed: Jun. 1, 2011

(86) PCT No.: PCT/EP2011/059096
§ 371 (c)(1),
(2), (4) Date: Dec. 17, 2012

(87) PCT Pub. No.: WO2011/157562
PCT Pub. Date: Dec. 22, 2011

(65) Prior Publication Data
US 2013/0102738 A1      Apr. 25, 2013

(30) Foreign Application Priority Data

Jun. 15, 2010   (DE) .......................... 10 2010 030 096

(51) Int. Cl.
*C08G 18/10*     (2006.01)
*C08G 65/336*    (2006.01)
*C09J 175/08*    (2006.01)

(52) U.S. Cl.
USPC .......................................... 525/453; 528/28

(58) Field of Classification Search
USPC .......................................... 525/455; 528/28
See application file for complete search history.

(56) References Cited

U.S. PATENT DOCUMENTS

| | | |
|---|---|---|
| 2004/0181025 A1 | 9/2004 | Schindler et al. |
| 2004/0204539 A1 | 10/2004 | Schindler et al. |
| 2007/0088137 A1 | 4/2007 | Georgeau et al. |
| 2007/0100111 A1 * | 5/2007 | Stanjek et al. .................. 528/44 |
| 2007/0219299 A1 | 9/2007 | Okamoto et al. |
| 2007/0287787 A1 | 12/2007 | Ferrand |
| 2009/0182091 A1 | 7/2009 | Noro et al. |
| 2009/0324965 A1 | 12/2009 | Beck et al. |
| 2010/0035998 A1 | 2/2010 | Mannion |

FOREIGN PATENT DOCUMENTS

| | | | |
|---|---|---|---|
| DE | 10 2007 011 511 A1 | 9/2008 | |
| EP | 1 414 909 | 5/2004 | |
| EP | 1 421 129 | 5/2004 | |
| EP | 1 867 693 A1 | 12/2007 | |
| EP | 1943292 B1 * | 10/2011 | .............. C08L 83/10 |
| JP | 2009508965 A | 3/2009 | |
| JP | 2010507687 A | 3/2010 | |
| WO | 20051000931 A1 | 1/2005 | |
| WO | 2005108499 A1 | 11/2005 | |
| WO | 2007050538 A2 | 5/2007 | |
| WO | WO 2007050538 A2 * | 5/2007 | .............. C08L 83/10 |
| WO | 2007094275 A1 | 8/2007 | |

* cited by examiner

*Primary Examiner* — Randy Gulakowski
*Assistant Examiner* — Christopher M Rodd
(74) *Attorney, Agent, or Firm* — Brooks Kushman P.C.

(57) ABSTRACT

The invention provides curable adhesives of high tensile sheer strength, which contain an α-silane-terminated polyurethane prepolymer containing low molecular weight polyether or polyester groups in the polymer backbone, and a silane-terminated polyether polymer containing polyether groups of higher molecular weight.

21 Claims, No Drawings

SILANE-CROSSLINKING COMPOSITIONS

CROSS-REFERENCE TO RELATED APPLICATIONS

This application is the U.S. national phase of PCT Appln. No. PCT/EP2011/059096 filed Jun. 1, 2011, which claims priority to German Patent Application No. 10 2010 030 096.9 filed Jun. 15, 2010, which are incorporated herein by reference.

BACKGROUND OF THE INVENTION

1. Field of the Invention

The invention relates to one-component, silane-crosslinking compositions which are used as adhesives having high tensile shear strength and a high curing rate.

2. Description of the Related Art

Among the known means of implementing adhesive bonds on wood are wood glues, formulated typically on the basis of polyvinyl acetate dispersions. Although they exhibit good adhesion to wood, their setting rate, i.e., the time which elapses before a loadable bond is formed, is very long, and so mechanical fixing of the workpieces that are to be bonded, for some time, is generally unavoidable. Furthermore, the use of this type of adhesive presents problems if the bond is exposed to moisture, since the wood glues typically have only limited resistance toward water.

In the case of wooden constructions which are subject to high stresses, where the requirements imposed on the mechanical strength of the components are exacting and the bond strength is still to be high enough even after many years under the effects of weathering, wood glues of this kind are usually not appropriate.

Here, customarily, isocyanate-crosslinking PU adhesives are used. These adhesives typically comprise aromatic polyisocyanates. Systems of this kind cure by reaction of the isocyanate groups with (atmospheric) moisture.

Since PU adhesives cure via a chemical crosslinking reaction and are able to attach chemically as well to the wood substrate, they exhibit significantly better mechanical properties and are also substantially more resistant toward external (weathering) effects such as moisture or direct water contact.

The general performance of adhesives is specified through compliance with standards, such as, for example, DIN EN 204, durability classes D1-D4. These standards can generally be met by isocyanate-crosslinking adhesives.

Nevertheless, even some isocyanate-crosslinking adhesives possess massive disadvantages inherent in the system. For example, one-component PU adhesive systems generally possess no more than moderate cure rates. It is true that the isocyanate crosslinking can in principle be accelerated sharply by aggressive catalysis. However, since such catalysis in principle also catalyzes unwanted side reactions of the isocyanate groups (e.g., formation of allophanates, uretdiones, isocyanurates, etc.), the systems in question then no longer have sufficient shelf life.

Another disadvantage of the isocyanate-crosslinking adhesives is the sensitizing effect of all the isocyanate-containing compounds. Moreover, many monomeric isocyanates are toxic or even very toxic and/or are suspected of being carcinogenic. This presents problems insofar as the end user, i.e., the craftworker or do-it-yourself user, comes into contact not only with the cured and hence isocyanate-free and entirely unobjectionable product, but also with the isocyanate-containing adhesive. For the unpracticed home improver there is a particular risk here that the products may not be used expertly and/or properly. Additional hazards arise here from incorrect storage as well, such as storage within the reach of children. With the professional craftworker, on the other hand, proper use and storage can be assumed. Here, however, the problem may exist that the professional user is required regularly—possibly even a number of times a day—to work with the isocyanate-containing material, a fact which is potentially critical in view in particular of the aforementioned sensitizing effect of isocyanates.

Somewhat more favorable here are isocyanate-crosslinking adhesives which contain only very low levels of volatile isocyanates and are therefore at least free from labeling requirements. These adhesives, however, are mostly based on aliphatic isocyanates, which in turn are less reactive. For applications where rapid setting of the adhesive is a factor, therefore, these adhesives are once again less favorable than conventional PU adhesives.

Further disadvantages of isocyanate-based adhesives are, moreover, the tendency that occurs particularly in a humid environment (bonding at high atmospheric humidity and/or bonding of moist workpieces) toward blistering as a result of formation of $CO_2$, and also the impossibility of removing unwanted adhesive contaminations without residue. The latter applies not only to cured but also to fresh residues of PU adhesive.

An alternative curing technology which is finding application increasingly in the adhesives sector is that of silane crosslinking, where alkoxy silane-functional prepolymers on contact with atmospheric moisture, initially undergo hydrolysis and then cure through a condensation reaction. The corresponding silane-functional—usually silane-terminated—prepolymers are entirely unobjectionable from the standpoint of toxicology.

While conventional silane-crosslinking systems have long had the disadvantage of a relatively low cure rate, more recent times have seen descriptions also of highly reactive systems, such as in EP 1414909 or in EP 1421129.

Customary silane-crosslinking adhesives have a backbone of long-chain polyethers having molar masses which are usually of the order of 10,000 daltons or more. Occasionally somewhat shorter-chain polyethers, typically with molar masses of 4000-8000 daltons, are used as well, and are then linked with diisocyanates to form longer units. Here as well, therefore, overall, very high molecular mass prepolymers are obtained, whose backbone continues to consist substantially of long-chain polyether units, the polyether chain being interrupted by a small number of urethane units. Systems of this kind are described in WO 05/000931, for example.

A disadvantage of all of these common silane-crosslinking systems, however, is a relatively low tensile shear strength. Consequently, customary applications for this new type of adhesive are generally confined to sectors in which the requirement is for elastic adhesives more than for adhesives of high tensile strength. Adhesives which meet European standard DIN EN 204, durability class D4, have not hitherto been achievable with silane-crosslinking adhesives.

SUMMARY OF THE INVENTION

The invention provides curable adhesives of high tensile sheer strength, which contain an α-silane-terminated polyurethane prepolymer containing low molecular weight polyether or polyester groups in the polymer backbone, and a silane-terminated polyether polymer containing polyether groups of higher molecular weight.

DETAILED DESCRIPTION OF THE PREFERRED EMBODIMENTS

The invention thus provides compositions (K) comprising
A) 100 parts by weight of a silane-terminated polyurethane prepolymer (STPU) comprising in its backbone urethane units and units (E) selected from polyether units and polyester units, the individual polyether units and polyester units (E) having an average molar mass of not more than 4000 daltons, and having at least one end group of the general formula (1)

$$L^1\text{-}(CH_2)_y\text{---}SiR^2{}_{3-x}(OR^1)_x \qquad (1),$$

B) 1 to 200 parts by weight of a silane-terminated polyether (STPE) having in its backbone polyether units having an average molar mass of 5000 to 30,000 daltons and having end groups of the general formula (2)

$$\text{-}L^2\text{-}(CH_2)_m\text{---}SiR^4{}_{3-n}(OR^3)_n \qquad (2)$$

C) 0 to 10 parts by weight of a curing catalyst (HK) which accelerates the curing of the compositions (K) in the presence of atmospheric moisture, where
$L^1$ is a divalent linking group selected from —O—, —S—, —($R^5$)N—, —O—CO—N($R^5$)—, —N($R^5$)—OO—O—, —N($R^5$)—CO—NH—, —NH—CO—N($R^5$)—, —N($R^5$)—CO—N($R^5$),
$L^2$ is a divalent linking group selected from —O—, —S—, —($R^6$)N—, —O—CO—N($R^6$)—, —N($R^6$)—CO—O—, —N($R^6$)—CO—NH—, —NH—CO—N($R^6$)—, —N($R^6$)—CO—N($R^6$),
$R^1$, $R^2$, $R^3$ and $R^4$ are unsubstituted or halogen-substituted hydrocarbon radicals having 1-6 carbon atoms, or hydrocarbon radicals interrupted by nonadjacent oxygen atoms and having a total of 2-20 carbon atoms,
$R^5$ and $R^6$ are hydrogen, an unsubstituted or halogen-substituted cyclic, linear or branched $C_1$ to $C_{18}$ alkyl or alkenyl radical, a $C_6$ to $C_{18}$ aryl radical or a radical of the formula —$(CH_2)_y$—$SiR^2{}_{3-x}(OR^1)x$,
y is a whole number from 1 to 10,
x is 2 or 3,
n is 1, 2 or 3, and
m is a whole number from 1 to 10.

The silane-terminated polyurethanes (STPU) are preferably characterized in that they have been prepared from polyols (P1) selected from polyether polyols, polyester polyols or mixtures of different polyether and/or polyester polyols, the polyols (P1) or polyol mixtures (P1) having an average molar mass of not more than 2000 daltons.

With particular preference the silane-terminated polyurethanes (STPU) are prepared from the abovementioned polyols (P1) or polyol mixtures (P1), silanes (P2) which on the one hand have an isocyanate-reactive group or else an isocyanate group and on the other hand have a silyl group of the formula (3)

$$\text{---}SiR^2{}_{3-x}(OR^1)_x \qquad (3)$$

with all of the variables having the definition identified above, with diisocyanates and/or triisocyanates (P3), and also, optionally, with further components. Particularly preferred in this case is the use of diisocyanates and polyols (P1) or polyol mixtures (P1) having two and/or three hydroxyl groups and having an average molar mass of not more than 1000 daltons. The silane-terminated polyurethanes (STPU) preferably have an average molar mass of 400 to 10,000 daltons, more preferably of 800 to 5000 daltons.

Furthermore, silane-terminated polyurethanes (STPU) are preferably characterized in that as well as the silane termini of the general formula (1) they also possess termini of the general formula (4)

$$L^3\text{-}R^7 \qquad (4),$$

where
$R^7$ is an unsubstituted or halogen-substituted linear, branched or cyclic alkyl, alkenyl or arylalkyl radical having at least 7 carbon atoms, and
$L^3$ is a divalent linking group selected from —O—, —S—, —($R^5$)N—, —O—CO—N($R^5$)—, —N($R^5$)—CO—O, —N($R^5$)—CO—NH—, —NH—CO—N($R^5$)—, —N($R^5$)—CO—N($R^5$).

Preferably at least 2%, more preferably at least 4%, and preferably not more than 40%, more particularly not more than 20%, of all of the chain ends of the silane-terminated polyurethanes (STPU) are terminated with groups of the general formula (3).

The silane-terminated polyether (STPE) preferably comprises linear polypropylene glycols having two end groups of the general formula (2) and average molar masses of 8000 to 20,000 daltons. The silane-terminated polyethers (STPE) preferably have no additional urethane units in the polymer backbone. The average molar masses of the silane-terminated polyethers (STPE) preferably come about by addition of the average molar masses of the polyethers present in the polymer backbone, and of the two end groups of the general formula (2).

The invention is based on three discoveries. Thus it was first observed that compositions (K) based on silane-terminated polyurethanes (STPU) cure to give significantly harder and more tensile shear-resistant materials than compositions with prepolymers based on long-chain polyols, of the kind used typically for conventional silane-crosslinking adhesives and sealants.

Likewise surprising was the second discovery, whereby the inventive addition of the silane-terminated polyethers (STPE) to the STPU-based system leads, first, to a marked reduction in the viscosity of the resultant mixture. This is all the more surprising in view of the fact that the preferred molar masses of the STPE prepolymers are well above the preferred molar masses of the customary STPU prepolymers.

It was further discovered that the addition the silane-terminated polyethers (STPE) to the STPU-based system surprisingly leads to an improvement in the mechanical properties of the resultant cured compositions (K). More particularly this addition gives the otherwise relatively brittle materials, surprisingly, the elasticity that is necessary for a high tensile shear strength. Also surprising is the fact that addition of STPE massively improves the hot water resistance required for wood adhesives by the DIN EN 204 D4 standard among others.

The particularly preferred embodiment of the invention whereby the silane-terminated polyurethanes (STPU) possess not only the silane termini of the general formula (1) but also termini of the formula (4) is based on a further surprising discovery.

Accordingly it has been discovered that through the use of the corresponding silane-terminated polyurethanes (STPU) which as well as the silane termini of the general formula (1) also possess chain termini of the general formula (4) it is possible to obtain compositions (K) which after they have cured are significantly more resistant to hot water than cured compositions (K) of which the silane-terminated polyurethanes (STPU) do not possess any chain ends of the general formula (4).

In the formulae given above, $L^1$ is preferably a divalent linking group selected from —O—CO—NH— or —NH—CO—N($R^3$)—, the latter being particularly preferred.

$L^2$ is preferably a divalent linking group selected from —O—, —NH—, CO—O— and O—CO—NH, the last-mentioned group being particularly preferred.

$L^3$ is preferably a divalent linking group selected from —NH—CO—N($R^3$)—, —N($R^3$)—CO—NH—, —O—CO—NH—, and —NH—CO—O, the last-mentioned group being particularly preferred.

The radicals $R^1$, $R^2$, $R^3$ and $R^4$ are preferably hydrocarbon radicals having 1 to 6 carbon atoms, more particularly an alkyl radical having 1 to 4 carbon atoms, such as methyl or ethyl or propyl radicals. $R^2$ and $R^4$ are more preferably a methyl radical; $R^1$ and $R^3$ more preferably represent methyl or ethyl radicals.

The radicals $R^5$ and $R^6$ are preferably hydrogen or a hydrocarbon radical having 1 to 10 carbon atoms, more preferably hydrogen, a branched or unbranched alkyl radical having 1 to 6 carbon atoms, such as methyl or ethyl or propyl radicals, a cyclohexyl radical or a phenyl radical.

y and m are preferably 1 or 3, more preferably 1. The last-mentioned value is particularly preferred on account of the fact that the corresponding silane-terminated polyurethanes (STPU) or silane-terminated polyethers (STPE), in which the silyl group is separated only by one methylene spacer from an adjacent heteroatom, are notable for particularly high reactivity toward atmospheric moisture. The resulting compositions (K) have correspondingly short setting times and, furthermore, generally no longer require any heavy metal-containing catalysts, and more particularly no tin-containing catalysts.

The variable n is preferably 2 or 3.

The radical $R^7$ is preferably a linear or branched alkyl or alkenyl radical having at least 8 carbon atoms, with linear alkyl radicals having at least 8 carbon atoms, more particularly alkyl radicals having at least 10 carbon atoms, being particularly preferred. Preferably $R^7$ has not more than 30, more preferably not more than 20, carbon atoms.

In the preparation of the silane-terminated polyurethanes (STPU) it is preferred to start from polyether polyols and/or polyester polyols (P1) having an average molar mass of not more than 2000, more particularly not more than 1500, daltons, with polyether polyols being particularly preferred. Especially preferred are polyether polyols having an average molar mass of not more than 1000 daltons. The preferred polyether types are polyethylene glycols and more particularly polypropylene glycols. The polyols (P1) may be branched or unbranched. Particular preference is given to unbranched polyols or else to polyols having one branching site. It is also possible to use mixtures of branched and unbranched polyols.

In the preparation of the silane-terminated polyurethanes (STPU), the polyols (P1) are preferably reacted with at least one isocyanate-functional compound. The silane-terminated polyurethanes (STPU) are prepared optionally in the presence of a catalyst. Suitable catalysts are, for example, bismuth-containing catalysts, such as, for example, the Borchi® Kat 22, Borchi® Kat VP 0243, Borchi® Kat VP 0244 from Borchers GmbH or else those compounds which are added to the composition (K) as curing catalysts (HK).

The prepolymer synthesis is preferably carried out at temperatures of at least 0° C., more preferably at least 60° C., and preferably not more than 150° C., more preferably not more than 120° C. This synthesis may take place continuously or discontinuously.

In one preferred mode of preparing the silane-terminated polyurethanes (STPU), the aforementioned polyols or polyol mixtures (P1) are reacted with a silane (P2) of the general formulae (5)

$$OCN—(CH_2)_y—SiR^2_{3-x}(OR^1)_x \quad (5),$$

where $R^1$, $R^2$, x and y have the definitions indicated for the general formula (1).

Furthermore, as a third prepolymer component, a di- or polyisocyanate (P3) is also used as well. Examples of commonplace diisocyanates are diisocyanatodiphenylmethane (MDI), both in the form of crude or technical MDI and in the form of pure 4,4' or 2,4' isomers or mixtures thereof, tolylenediisocyanate (TDI) in the form of its different regioisomers, diisocyanatonaphthalene (NDI), isophorone diisocyanate (IPDI) or else hexamethylene diisocyanate (HDI). Examples of polyisocyanates are polymeric MDI (P-MDI), triphenylmethane triisocyanate or else trimers (biurets or isocyanurates) of the aforementioned diisocyanates.

Finally, as a fourth prepolymer component, it is also possible to use monomeric alcohols (P4) as well. These alcohols may possess one or else two or more hydroxyl groups. With regard to the molar mass and the degree of branching of the alcohols (P4) there are no restrictions at all.

As alcohols (P4) it is preferred to use compounds of the general formula (6)

$$R^7OH \quad (6)$$

where $R^7$ has the definition indicated for the general formula (4). In the synthesis of the prepolymers silane-terminated polyurethanes (STPU), these alcohols, through a reaction with the di- or polyisocyanates (P3), form chain termini of the general formula (4).

All of the prepolymer components are used in a proportion whereby there is preferably at least 0.6, more preferably at least 0.8, and preferably not more than 1.4, more preferably not more than 1.2, isocyanate-reactive groups per isocyanate group.

The reaction product is preferably isocyanate-free. The sequence in which the components (P1) to (P4) are reacted with one another here is arbitrary.

In one further preferred preparation process for the silane-terminated polyurethanes (STPU), the aforementioned polyols or polyol mixtures (P1) are used with a di- or polyisocyanate (P3'). Here it is possible to use the same isocyanate-functional compounds already described above as isocyanates (P3). The isocyanates (P3') are used in excess, thus giving an isocyanate-terminated "intermediate prepolymer" (ZW).

This "intermediate prepolymer" (ZW) is then reacted, in a second reaction step, with an isocyanate-reactive silane (P2') of the general formula (7)

$$B—(CH_2)_y—SiR^2_{3-x}(OR^1)_x \quad (7),$$

where B is isocyanate-reactive group, preferably a hydroxyl group or more preferably an amino group of the formula $NHR^5$, and x, y, $R^1$, $R^2$ and $R^5$ have the definitions indicated above.

The sequence of the synthesis steps can in principle also be switched. Accordingly, the first synthesis step may in principle also be a reaction of the isocyanate (P3') with the silane (P2'), and the reaction with the polyol (P1) may only take place in the second reaction step. It is also conceivable for both reaction steps to be carried out simultaneously. These reactions as well may be carried out either discontinuously or continuously.

Finally monomeric alcohols (P4') as well may be incorporated, as a fourth prepolymer component, into the silane-terminated polyurethanes (STPU). The alcohols (P4') may possess one or else two or more hydroxyl groups. With regard to the molecular mass and the degree of branching of the alcohols (P4') there are no restrictions at all.

As alcohols (P4') it is preferred to use compounds of the abovementioned general formula (6). This results in silane-terminated polyurethanes (STPU) whose chain ends are not exclusively silane-terminated, but instead also possess a certain fraction, preferably at least 2%, more preferably at least 4%, and preferably not more than 40%, more preferably not more than 20%, of chain ends of the general formula (4).

The alcohols (P4') here may be incorporated in a separate reaction step into the silane-terminated polyurethanes (STPU), as for example before or after the reaction of the polyols (P1) with the isocyanates (P3'). Alternatively, however, the incorporation may also take place simultaneously with another reaction step, as for example by reacting a mixture of the polyols (P1) and the alcohols (P4') with the isocyanates (P3').

It is preferred here to use alcohols (P4'), mixtures of different alcohols (P4') or else mixtures of polyols (P1) and alcohols (P4') which are liquid at room temperature and, accordingly, can be easily metered in to the reaction mixture.

In the case of this second preferred preparation process for the silane-terminated polyurethanes (STPU) as well, all of the prepolymer components are used in a proportion whereby there is preferably at least 0.6, more preferably at least 0.8, and preferably not more than 1.4, more preferably not more than 1.2, isocyanate-reactive groups per isocyanate group. The reaction product is preferably isocyanate-free.

Examples of silane-terminated polyethers are products from Kaneka which are available commercially under the brand name Kaneka MS Polymer® or products from Wacker Chemie A.G. which are available under the brand name GENIOSIL® STP-E, e.g., STP-E10, STP-E30, STP-E15 or STP-E35.

In the formulation of the composition (K) use is preferably made preferably of at least 1, more at least 5, and preferably not more than 50, more particularly not more than 20, parts by weight of silane-terminated polyethers (STPE) per 100 parts by weight of silane-terminated polyurethanes (STPU).

The compositions (K) preferably also comprise curing catalysts (HK). Furthermore, they may comprise water scavengers and silane crosslinkers (WS), fillers (F), plasticizers (W), adhesion promoters (H), rheological assistants (R), and stabilizers (S), and possibly also color pigments as well, and also other customary auxiliaries and additives.

Serving as curing catalysts (HK) may be, for example, titanate esters such as tetrabutyl titanate, tetrapropyl titanate, tetraisopropyl titanate, and tetraacetylacetonate titanate; tin compounds such as dibutyl tin dilaurate, dibutyl tin maleate, dibutyl tin diacetate, dibutyl tin dioctanoate, dibutyl tin acetylacetonate, dibutyl tin oxide, or corresponding compounds of dioctyl tin; basic catalysts, e.g., aminosilanes such as aminopropyltrimethoxysilane, aminopropyltriethoxysilane, aminopropyl-methyldimeth-oxysilane, aminopropyl-methyldiethoxysilane, N-(2-aminoethyl) aminopropyltrimethoxysilane, N-(2-aminoethyl) aminopropyltrimethoxysilane, N-(2-aminoethyl) aminopropyltriethoxysilane, N-(2-aminoethyl)aminopropyl-methyldimethoxysilane, N-cyclohexylaminomethyltriethoxysilane, N-cyclohexy-laminomethyl-methyldiethoxysilane, N-cyclohexylaminomethyl-trimethoxysilane, N-cyclohexylaminomethyl-methyldimethoxysilane, and other organic amines, such as triethylamine, tributylamine, 1,4-diazabicyclo[2.2.2]octane, N,N-bis-(N,N-dimethyl-2-aminoethyl)methylamine, N,N-dimethyl-cyclohexylamine, N,N-dimethylphenylamine, N-ethylmorpholine; or acid catalysts such as phosphoric acid or phosphoric esters, toluenesulfonic acids, and mineral acids, with preference being given to catalysts free from heavy metals.

Per 100 parts by weight of silane-terminated polyurethanes (STPU) it is preferred to use at least 0.01 part by weight, more preferably at least 0.05 part by weight, and preferably not more than 10 parts by weight, more preferably not more than 1 part by weight of curing catalysts (HK). The various catalysts may be used both in pure form and as mixtures.

Serving as water scavengers and silane crosslinkers (WS) there may be, for example, vinylsilanes such as vinyltrimethoxysilane, vinyltriethoxysilane, vinylmethyldimethoxy-, glycidyloxypropyltrimethoxysilane, glycidyloxypropyltriethoxysilane, O-methyl-carbamatomethyl-methyldimethoxysilane, O-methyl-carbamatomethyl-trimethoxysilane, O-ethyl-carbamatomethyl-methyldiethoxysilane, O-ethyl-carbamatomethyl-triethoxysilane, alkylalkoxysilanes in general, or else other organofunctional silanes. It is of course possible also to make use of the same aminosilanes already described in connection with the condensation catalysts (KK). These silanes then often assume a dual function, as catalyst and crosslinker silane. All silane crosslinkers (S), more preferably all silanes having amino or glycidyloxy functions may also function, furthermore, as adhesion promoters.

Per 100 parts by weight of silane-terminated polyurethanes (STPU) it is preferred to use 0 to 20 parts by weight, more preferably 0 to 4 parts by weight of water scavengers and silane crosslinkers (WS). The various water scavengers and silane crosslinkers (WS) may be used either in pure form or else as mixtures.

Serving as fillers (F) there may be, for example, calcium carbonates in the form of natural ground chalks, ground and coated chalks, precipitated chalks, precipitated and coated chalks, clay minerals, bentonites, kaolins, talc, titanium dioxides, aluminum oxides, aluminum trihydrate, magnesium oxide, magnesium hydroxide, carbon blacks, and precipitated or fumed hydrophilic or hydrophobic silicas. Preference is given to the use of calcium carbonates and precipitated or fumed, hydrophilic or hydrophobic silicas, more preferably fumed, hydrophilic or hydrophobic silicas, and most preferably fumed hydrophilic silicas.

Per 100 parts by weight of silane-terminated polyurethanes (STPU) it is preferred to use 0 to 200 parts by weight, more preferably 0 to 100 parts by weight, of fillers (F).

Serving as plasticizers (W) are, for example, phthalate esters such as dioctyl phthalate, diisooctyl phthalate, and diundecyl phthalate; adipic esters such as dioctyl adipate; benzoic esters, glycol esters, phosphoric esters, sulfonic esters, polyesters, polyethers, polystyrenes, polybutadienes, polyiso-butenes, paraffinic hydrocarbons, higher, branched hydrocarbons, etc.

Per 100 parts by weight of silane-terminated polyurethanes (STPU) it is preferred to use 0 to 50 parts by weight, of plasticizers (W).

One particularly favorable type of plasticizer is represented by silanes (WS) of the general formula (8)

$$R^8SiR^9{}_{3-z}(OR^{10})_z \qquad (8)$$

where
R⁸ is an unsubstituted or halogen-substituted, linear, branched or cyclic alkyl, alkenyl or arylalkyl radical having at least 7 carbon atoms,
R⁹ and R¹⁰ are unsubstituted or halogen-substituted hydrocarbon radicals having 1-6 carbon atoms, or hydrocarbon radicals which are interrupted by nonadjacent oxygen atoms and have a total of 2-20 carbon atoms, and
Z is 1, 2 or 3.

The radical R⁸ is preferably a linear or branched alkyl or alkenyl radical having at least 8 carbon atoms, particular preference being given to alkyl radicals having at least 8 carbon atoms, more particularly alkyl radicals having at least 12 carbon atoms. Preferably R⁸ has not more than 40, more preferably not more than 25, carbon atoms. The radicals R⁹ and R¹⁰ are preferably hydrocarbon radicals having 1 to 6 carbon atoms, more preferably an alkyl radical having 1 to 4 carbon atoms, such as the methyl, ethyl, and propyl radicals. R⁹ is more preferably a methyl radical; R¹⁰ is more preferably a methyl or ethyl radical. The variable z is preferably 2 or 3, more preferably 3.

Particularly preferred silanes (WS) are n-octyltrimethoxysilane, isooctyltrimethoxysilane, n-octyltriethoxysilane, isooctyltriethoxysilane, the various stereoisomers of nonyltrimethoxysilane, decyltrimethoxysilane, undecyltrimethoxysilane, dodecyltrimethoxysilane, tridecyltrimethoxysilane, tetradecyltrimethoxysilane, pentadecyltrimethoxysilane, hexadecyltridecyl-trimethoxysilane, heptadecyltrimethoxysilane, octadecyltrimethoxysilane, nonadecyltrimethoxysilane, and also the corresponding triethoxysilanes. Particular preference is given to n-hexadecyltrimethoxysilane.

The advantage of the silane-functional plasticizers (WS) lies in the fact that these plasticizers are incorporated chemically during the curing of the composition (K) of the invention into the resultant network. This leads on the one hand to an improvement in the mechanical properties, of the resulting adhesive especially the elastic properties. On the other hand, a slow exudation of the plasticizer is reliably ruled out in this way.

For the formulation of the composition (K), not more than 40 parts by weight, preferably not more than 30 parts by weight, and more preferably not more than 20 parts by weight of silane (WS) are used per 100 parts by weight of silane-terminated polyurethanes (STPU). Where silanes (WS) are used, it is preferred to use at least 3 and more preferably at least 5 parts by weight of silane (WS) per 100 parts by weight of silane-terminated polyurethanes (STPU).

Another particularly preferred type of additive for the composition (K) is represented by alcohols (A) of the general formula (9)

R¹¹OH          (9)

where
R¹¹ is an unsubstituted or halogen-substituted hydrocarbon radical having 1-20 carbon atoms, or hydrocarbon radical interrupted by nonadjacent oxygen atoms and having a total of 2-20 carbon atoms.

The radical R¹¹ is preferably an alkyl radical having 1-8 carbon atoms and more preferably a methyl, ethyl, isopropyl, propyl, butyl, isobutyl, tert-butyl, pentyl, cyclopentyl, isopentyl, tert-butyl, hexyl or cyclohexyl radical. Particularly suitable alcohols (A) are ethanol and methanol.

Thus it has been found that the addition of alcohols (A) to the compositions (K) massively lowers their viscosity even when only very small amounts are added. The viscosity decrease in this case is significantly greater than is the case with addition of other low molecular mass compounds and/or solvents.

In the formulation of the composition (K), not more than 30 parts by weight, preferably not more than 15 parts, and more preferably not more than 5 parts by weight of alcohol (A) are used per 100 parts by weight of silane-terminated polyurethanes (STPU). Where alcohols (A) are used, it is preferred to use at least 0.5 part by weight and more preferably at least 1 part by weight of alcohol (A) per 100 parts by weight of silane-terminated polyurethanes (STPU).

Examples of adhesion promoters (H) are silanes and organopolysiloxanes having functional groups, such as those having glycidyloxypropyl, aminopropyl, aminoethylaminopropyl, ureidopropyl or methacryloyloxypropyl radicals. If, however, another component, such as the curing catalyst (HK) or the water scavenger and silane crosslinker (WS), for instance, already contains the stated functional groups, it is also possible not to add any adhesion promoter (H).

As rheological additives (R) it is possible, for example, to use thixotropic agents. Mention may be made here, by way of example, of hydrophilic fumed silicas, coated fumed silicas, precipitated silicas, polyamide waxes, hydrogenated castor oils, stearate salts or precipitated chalks. The abovementioned fillers may also be utilized for adjusting the flow properties.

Per 100 parts by weight of silane-terminated polyurethanes (STPU) it is preferred to use 0 to 10 parts by weight, more preferably 0 to 5 parts by weight, of thixotropic agents.

As stabilizers (S) it is possible, for example, to use antioxidants or light stabilizers, such as those known as HALS stabilizers, sterically hindered phenols, thioethers or benzotriazole derivatives.

Moreover, the composition (K) may also comprise other additives as well, examples being solvents, fungicides, biocides, flame retardants and pigments.

After curing, the compositions (K) have a very high tensile shear strength. They are used preferably as adhesives (K) and preferably for adhesive bonds which after curing have a tensile shear strength of at least 7 mPa, more preferably at least 8 mPa, and most preferably at least 10 mPa. They are preferably used for the bonding of wood, i.e., for adhesive bonds where at least one of the substrates to be bonded, and preferably both substrates to be bonded, are made of wood. The adhesives (K) are suitable for bonding any types of wood. They are used with particular preference for adhesive bonds which after curing meet the DIN EN 204 D1, D2, D3 and/or D4 standards. Furthermore, they are also suitable for bonds possessing tensile shear strength between numerous further substrates, more particularly metals, plastics, glass, ceramic, concrete, stone materials, paper, cardboard or leather.

All of the above symbols in the above formulae have their definitions in each case independently of one another. In all formulae the silicon atom is tetravalent. All average molar masses are number averages $M_n$.

In the examples which follow, all amounts and percents, unless otherwise indicated, are by weight, all pressures are 0.10 MPa (abs.), and all temperatures are 20° C.

EXAMPLES

Example 1

In a 500 ml reaction vessel with stirring, cooling, and heating facilities, 109.8 g (630.5 mmol) of toluene 2,4-diisocyanate (TDI) are introduced and heated to 60° C. Then a mixture of 20.7 g (85.4 mmol) of hexadecyl alcohol and 124.8 g (293.6 mmol) of a polypropylene glycol having an average molar mass of 425 g/mol is added. The temperature of the reaction mixture should not rise to above 80° C. This is followed by stirring at 60° C. for 60 minutes.

The reaction mixture is subsequently cooled to about 50° C. and 7.5 ml of vinyltrimethoxysilane are added. Thereafter 0.42 g of Jeffcat® DMDLS from Huntsman and 120.0 g (567.8 mmol) of N-phenylaminomethyl-methyldimethoxysilane (GENIOSIL® XL 972 from Wacker Chemie AG) are added, during which the temperature should not rise to above 80° C. This is followed by stirring at 60° C. for a further 60 minutes. In the resulting prepolymer mixture, isocyanate groups are no longer detectable by IR spectroscopy. A clear, translucent prepolymer mixture is obtained which at 50° C. has a viscosity of 13.5 Pas. It is very amenable to further processing.

Example 2

Preparation of a One-Component Adhesive Formulation from Abovementioned Prepolymers 87.7 g of prepolymer from example 1, 9.8 g of silane-terminated polypropylene glycol having end groups of the general formula (2) with m=3, $R^3$=methyl radical, and n=3 (GENIOSIL® STP-E 15 from Wacker Chemie AG) and 2.5 g of 3-aminopropyltrimethoxysilane GENIOSIL® GF 96 from Wacker Chemie AG) are stirred together in a suitable mixing apparatus. This gives a yellowish adhesive having a viscosity of 350 Pas (Brookfield, spindle 6, 2.5 min$^{-1}$). This adhesive is used to bond beech specimens as described in DIN EN 204, and a determination is made of the tensile shear strengths. In this determination, the values found for this formulation are as follows:

| Durability class | Bond strength N/mm$^2$ |
|---|---|
| D1 (storage sequence 1) | 14.0 |
| D2 (storage sequence 2) | 8.9 |
| D3 (storage sequence 3) | 3.6 |
| D4 (storage sequence 4) | 8.6 |
| D5 (storage sequence 5) | 4.0 |

Example 3

Preparation of a One-Component Adhesive Formulation from Abovementioned Prepolymers 44.3 g of prepolymer from example 1, 4.9 g of GENIOSIL® STP-E 15, 1.5 g of vinyltrimethoxysilane (GENIOSIL® XL 10 from Wacker Chemie AG), 47.8 g of Martinal OL 104, and 1.5 g of 3-aminopropyltrimethoxysilane (GENIOSIL® GF 96 from Wacker Chemie AG) are stirred together in a suitable mixing apparatus. This gives a beige adhesive having a viscosity of 2700 Pas (Brookfield, spindle 7, 0.5 min$^{-1}$). This adhesive is used to bond beech specimens as described in DIN EN 204, and a determination is made of the tensile shear strengths. In this determination, the values found for this formulation are as follows:

| Durability class | Bond strength N/mm$^2$ |
|---|---|
| D1 (storage sequence 1) | 13.2 |
| D2 (storage sequence 2) | 9.1 |
| D3 (storage sequence 3) | 3.6 |
| D4 (storage sequence 4) | 7.8 |
| D5 (storage sequence 5) | 4.3 |

Example 4

Preparation of a One-Component Adhesive Formulation from Abovementioned Prepolymers 84.8 g of prepolymer from example 1, 9.4 g of GENIOSIL® STP-E 15, 2.9 g of vinyltrimethoxysilane (GENIOSIL® XL 10 from Wacker Chemie AG), and 2.9 g of N-(2-aminoethyl)-3-aminopropyltrimethoxysilane (GENIOSIL® GF 9 from Wacker Chemie AG) are stirred together in a suitable mixing apparatus. This gives a yellowish adhesive having a viscosity of 130 Pas (Brookfield, spindle 6, 2.5 min$^{-1}$). This adhesive is used to bond beech specimens as described in DIN EN 204, and a determination is made of the tensile shear strengths. In this determination, the values found for this formulation are as follows:

| Durability class | Bond strength N/mm$^2$ |
|---|---|
| D1 (storage sequence 1) | 16.2 |
| D2 (storage sequence 2) | 9.3 |
| D3 (storage sequence 3) | 3.6 |
| D4 (storage sequence 4) | 9.5 |
| D5 (storage sequence 5) | 4.4 |

Example 5

Preparation of a One-Component Adhesive Formulation from Abovementioned Prepolymers 44.3 g of prepolymer from example 1, 4.9 g of GENIOSIL® STP-E 15, 1.5 g of vinyltrimethoxysilane (GENIOSIL® XL 10 from Wacker Chemie AG), 47.8 g of Martinal OL 104, and 1.5 g of N-(2-aminoethyl)-3-aminopropyltrimethoxysilane (GENIOSIL® GF 9 from Wacker Chemie AG) are stirred together in a suitable mixing apparatus. This gives a beige adhesive having a viscosity of 2700 Pas (Brookfield, spindle 7, 0.5 min$^{-1}$). This adhesive is used to bond beech specimens as described in DIN EN 204, and a determination is made of the tensile shear strengths. In this determination, the values found for this formulation are as follows:

| Durability class | Bond strength N/mm$^2$ |
|---|---|
| D1 (storage sequence 1) | 15.0 |
| D2 (storage sequence 2) | 9.5 |
| D3 (storage sequence 3) | 4.2 |
| D4 (storage sequence 4) | 12.2 |
| D5 (storage sequence 5) | 4.4 |

Example 6

Preparation of a One-Component Adhesive Formulation from Abovementioned Prepolymers 67.9 g of prepolymer from example 1, 7.5 g of GENIOSIL® STP-E 15, 2.3 g of vinyltrimethoxysilane (GENIO- SIL® XL 10 from Wacker Chemie AG), 20.0 g of ethanol, and 2.3 g of N-(2-aminoethyl)-3-aminopropyltrimethoxysilane (GENIOSIL® GF 9 from Wacker Chemie AG) are stirred together in a suitable mixing apparatus. This gives a beige adhesive having a viscosity of 1 Pas (Brookfield, spindle 7, 0.5 min$^{-1}$). This adhesive is used to bond beech specimens as described in DIN EN 204, and a determination is made of the tensile shear strengths. In this determination, the values found for this formulation are as follows:

| Durability class | Bond strength N/mm$^2$ |
| --- | --- |
| D1 (storage sequence 1) | 17.0 |
| D2 (storage sequence 2) | 11.1 |
| D3 (storage sequence 3) | 4.9 |
| D4 (storage sequence 4) | 15.4 |
| D5 (storage sequence 5) | 5.0 |

Example 7

Preparation of a One-Component Adhesive Formulation from Abovementioned Prepolymers 67.9 g of prepolymer from example 1, 7.5 g of GENIOSIL® STP-E 15, 2.3 g of vinyltrimethoxysilane (GENIOSIL® XL 10 from Wacker Chemie AG), 20.0 g of ethanol, and 2.3 g of 3-aminopropyltrimethoxysilane (GENIOSIL® GF 96 from Wacker Chemie AG) are stirred together in a suitable mixing apparatus. This gives a beige adhesive having a viscosity of 1 Pas (Brookfield, spindle 7, 0.5 min$^{-1}$). This adhesive is used to bond beech specimens as described in DIN EN 204, and a determination is made of the tensile shear strengths. In this determination, the values found for this formulation are as follows:

| Durability class | Bond strength N/mm$^2$ |
| --- | --- |
| D1 (storage sequence 1) | 16.6 |
| D2 (storage sequence 2) | 11.0 |
| D3 (storage sequence 3) | 4.9 |
| D4 (storage sequence 4) | 15.3 |
| D5 (storage sequence 5) | 5.7 |

Example 8

Preparation of a One-Component Adhesive Formulation from Abovementioned Prepolymers 79.8 g of prepolymer from example 1, 8.9 g of GENIOSIL® STP-E 15, 9.8 g of hexadecyltrimethoxysilane and 1.5 g of 3-aminopropyltrimethoxysilane (GENIOSIL® GF 96 from Wacker Chemie AG) are stirred together in a suitable mixing apparatus. This gives a beige adhesive having a viscosity of 60 Pas (Brookfield, spindle 7, 0.5 min$^{-1}$). This adhesive is used to bond beech specimens as described in DIN EN 204, and a determination is made of the tensile shear strengths. In this determination, the values found for this formulation are as follows:

| Durability class | Bond strength N/mm$^2$ |
| --- | --- |
| D1 (storage sequence 1) | 14.1 |
| D2 (storage sequence 2) | 8.2 |
| D3 (storage sequence 3) | 3.0 |
| D4 (storage sequence 4) | 8.3 |
| D5 (storage sequence 5) | 3.3 |

Example 9

Preparation of a One-Component Adhesive Formulation from Abovementioned Prepolymers 41.1 g of prepolymer from example 1, 4.6 g of GENIOSIL® STP-E 15, 5.0 g of hexadecyltrimethoxysilane, 47.8 g of Martinal OL 104, and 1.5 g of 3-aminopropyltrimethoxysilane (GENIOSIL® GF 96 from Wacker Chemie AG) are stirred together in a suitable mixing apparatus. This gives a beige adhesive having a viscosity of 2500 Pas (Brookfield, spindle 7, 0.5 min$^{-1}$). This adhesive is used to bond beech specimens as described in DIN EN 204, and a determination is made of the tensile shear strengths. In this determination, the values found for this formulation are as follows:

| Durability class | Bond strength N/mm$^2$ |
| --- | --- |
| D1 (storage sequence 1) | 13.3 |
| D2 (storage sequence 2) | 8.0 |
| D3 (storage sequence 3) | 3.2 |
| D4 (storage sequence 4) | 8.1 |
| D5 (storage sequence 5) | 3.3 |

Example 10

Viscosity Reduction of a Silane-Terminated Polyurethane Prepolymer by Addition of a Silane-Terminated Polyether The silane-terminated prepolymer of example 1 has a viscosity at 20° C. of around 1,930,000 mPas. A mixture consisting of 90% by weight of a silane-terminated prepolymer of example 1 and 10% by weight of a silane-terminated polyether having an average molar mass of around 12,000 daltons and a viscosity at 20° C. of around 10,000 (GENIOSIL® STP-E 15) has a viscosity at 20° C. of only around 755,000 mPas.

In other words, as a result of the addition of the GENIOSIL® STP-E 15, a reduction in viscosity by a factor of around 2.5 is achieved, and is therefore dramatically below the linear average, whereby, at the quantitative ratio given above for the two types of polymer, a viscosity of around 1,740,000 mPas would have been anticipated.

This marked reduction in viscosity is all the more surprising in view of the fact that GENIOSIL® STP-E 15 has an average molar mass which is almost ten times greater than the average molar mass of the silane-terminated prepolymer according to example 1. In other words, the molar ratio of the two types of polymer is almost 99:1.

What is claimed is:
1. A composition, comprising
A) 100 parts by weight of a silane-terminated polyurethane prepolymer comprising in its backbone urethane units and polyether units and/or polyester units, the individual polyether units and polyester units having an average molar mass Mn of not more than 4000 daltons, and having at least one end group of the formula (1)

$$-L^1-(CH_2)_y-SiR^2{}_{3-x}(OR^1)_x \qquad (1),$$

B) 1 to 200 parts by weight of parts by weight of a silane-terminated polyether having in its backbone polyether units with an average molar mass Mn of 5000 to 30,000 daltons and having end groups of the formula (2)

$$-L^2-(CH_2)_m-SiR^4{}_{3-n}(OR^3)_n \qquad (2), \text{ and}$$

C) 0 to 10 parts by weight of a curing catalyst which accelerates the curing of the composition in the presence of atmospheric moisture, where $L^1$ is a divalent linking group —O—, —S—, —$(R^5)$N—, —O—CO—N$(R^5)$—, —N$(R^5)$—CO—O—, —N$(R^5)$—CO—NH—, —NH—CO—N$(R^5)$—, or —N$(R^5)$—CO—N$(R^5)$, $L^2$ is a divalent linking group —O—, —S—, —$(R^6)$N—, —O—CO—N$(R^6)$—, —N$(R^6)$—CO—O—, —N$(R^6)$—CO—NH—, —NH—CO—N$(R^6)$—, or —N$(R^6)$—CO—N$(R^6)$, $R^1$, $R^2$, $R^3$ and $R^4$ are unsubstituted or halogen-substituted hydrocarbon radicals having 1-6 carbon atoms, or hydrocarbon radicals interrupted by nonadjacent oxygen atoms and having a total of 2-20 carbon atoms, $R^5$ and $R^6$ are hydrogen, an unsubstituted or halogen-substituted cyclic, linear or branched $C_1$ to $C_{18}$ alkyl or alkenyl radical, a $C_6$ to $C_{18}$ aryl radical or a radical of the formula —$(CH_2)_y$—$SiR^2{}_{3-x}(OR^1)_x$, y is a whole number from 1 to 10, x is 2 or 3, n is 1, 2 or 3, and m is a whole number from 7 to 10, wherein the composition is free of isocyanate groups.

2. The composition of claim 1, wherein a silane-terminated polyurethane is prepared from at least one polyol selected from the group consisting of polyether polyols and polyester polyols or mixtures thereof, the polyols or mixtures thereof having an average molar mass Mn of not more than 2000 daltons.

3. The composition of claim 1, wherein a silane-terminated polyurethane possesses at least one terminus of the formula (4)

$$L^3-R^7 \qquad (4),$$

where $R^7$ is an unsubstituted or halogen-substituted linear, branched or cyclic alkyl, alkenyl or arylalkyl radical having at least 7 carbon atoms, and $L^3$ is a divalent linking group selected from —O—, —S—, —$(R^5)$N—, —O—CO—N$(R^5)$—, —N$(R^5)$—CO—O—, —N$(R^5)$—CO—NH—, —NH—CO—N$(R^5)$—, —N$(R^5)$—CO—N$(R^5)$, in addition to silane termini of the formula (1).

4. The composition of claim 2, wherein a silane-terminated polyurethane possesses at least one terminus of the formula (4)

$$L^3-R^7 \qquad (4),$$

where $R^7$ is an unsubstituted or halogen-substituted linear, branched or cyclic alkyl, alkenyl or arylalkyl radical having at least 7 carbon atoms, and $L^3$ is a divalent linking group selected from —O—, —S—, —$(R^5)$N—, —O—CO—N$(R^5)$—, —N$(R^5)$—CO—O—, —N$(R^5)$—CO—NH—, —NH—CO—N$(R^5)$—, —N$(R^5)$—CO—N$(R^5)$, in addition to silane termini of the formula (1).

5. The composition of claim 3, wherein 2 to 40% of all of chain ends of the silane-terminated polyurethane are terminated with groups of the formula (3)

$$-SiR^2{}_{3-x}(OR^1)_x \qquad (3).$$

6. The composition of claim 1, wherein a silane-terminated polyether is a linear polypropylene glycol having two end groups of the formula (2), with an average molar mass Mn of 8000 to 20,000 daltons.

7. The composition of claim 1, wherein at least one curing catalyst is a titanate ester, tin compound, or basic or acidic compound.

8. The composition of claim 1, wherein at least 0.01 part of curing catalyst is present per 100 parts by weight of silane-terminated polyurethane prepolymer.

9. The composition of claim 1, further comprising at least one alcohol of the formula (9)

$$R^{11}OH \qquad (9),$$

where $R^{11}$ is an unsubstituted or halogen-substituted hydrocarbon radical having 1-20 carbon atoms, or a hydrocarbon radical interrupted by nonadjacent oxygen atoms and having a total of 2-20 carbon atoms.

10. An adhesive composition comprising a composition of claim 1.

11. An adhesive composition comprising a composition of claim 2.

12. An adhesive composition comprising a composition of claim 3.

13. An adhesive composition comprising a composition of claim 5.

14. An adhesive composition comprising a composition of claim 6.

15. An adhesive composition comprising a composition of claim 9.

16. The composition of claim 1, wherein the silane-terminated polyurethane prepolymer has an average molar mass $M_n$ of from 400 to 10,000 Da.

17. The composition of claim 1, wherein the silane-terminated polyurethane prepolymer has an average molar mass $M_n$ of from 800 to 5,000 Da.

18. The composition of claim 1, wherein y is 1.

19. The composition of claim 1, wherein m is 1.

20. The composition of claim 1, wherein y is 1 and m is 1.

21. The composition of claim 1, wherein no catalyst (C) is present.

* * * * *